United States Patent [19]

Metz

[11] 4,052,098

[45] Oct. 4, 1977

[54] ADJUSTABLE END GATE ASSEMBLY FOR PICK-UP TRUCK OR OTHER VEHICLE

[76] Inventor: Lloyd E. Metz, Box 43, R.R. No. 2, Fairbury, Ill. 61739

[21] Appl. No.: 680,390

[22] Filed: Apr. 26, 1976

Related U.S. Application Data

[63] Continuation-in-part of Ser. No. 499,326, Aug. 21, 1974, abandoned.

[51] Int. Cl.² .............................................. B62D 33/00
[52] U.S. Cl. ...................................... 296/50; 105/494; 105/502; 280/179 R
[58] Field of Search ........................ 296/50, 51, 53, 55, 296/61; 280/179 R, 179 B; 105/502, 494, 378, 376

[56] References Cited

U.S. PATENT DOCUMENTS

| 232,256 | 9/1880 | Froelich | 105/376 |
| 1,597,105 | 8/1926 | Pardee | 296/50 |

Primary Examiner—Robert R. Song
Assistant Examiner—John A. Carroll
Attorney, Agent, or Firm—Tilton, Fallon, Lungmus, Chestnut & Hill

[57] ABSTRACT

An end gate assembly is disclosed for use on a pick-up truck or other vehicle which includes first and second end gates pivotally mounted on to the rack sides of the vehicle by means of horizontally elongated stringers over which the gate hinges may slide through intermediate positions between a forward position and a rear position. The gates may be latched to the sides in either the forward or the rear position, and they are independently adjustable when opened to form a V-shaped guide to a loading chute.

6 Claims, 6 Drawing Figures

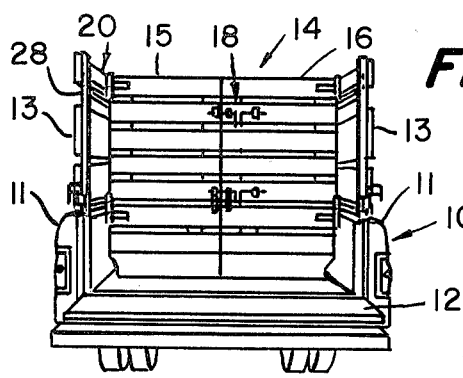
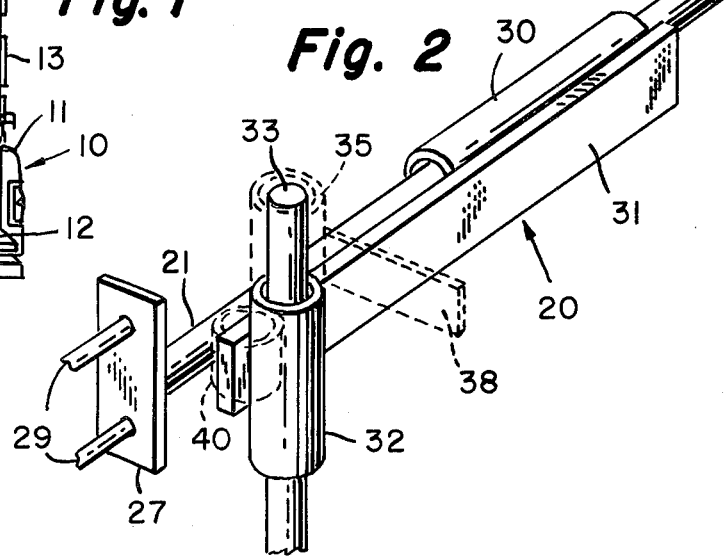
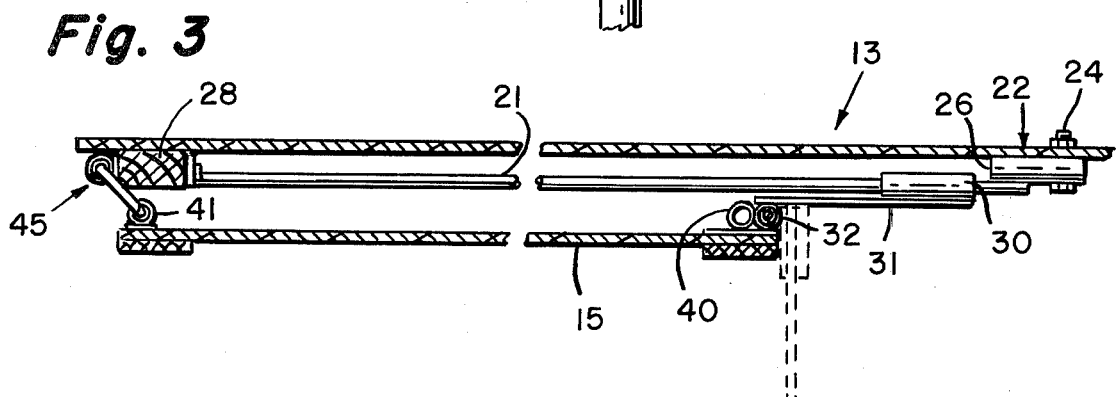
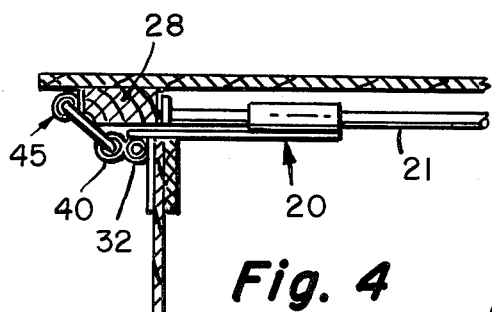
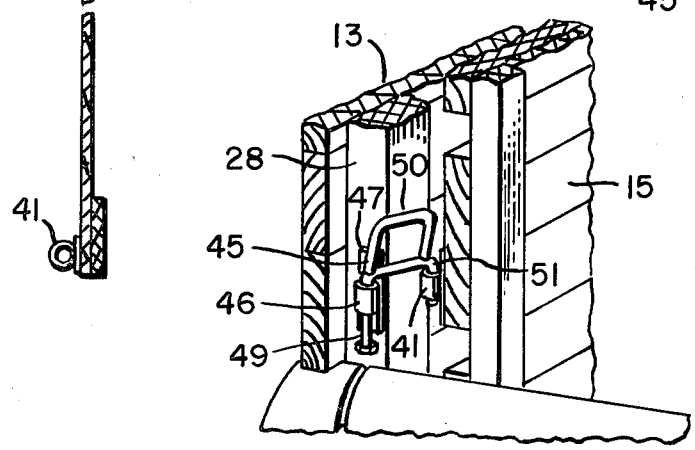
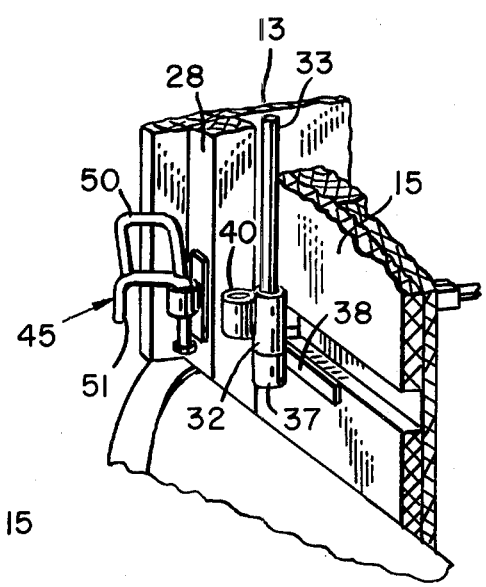

ADJUSTABLE END GATE ASSEMBLY FOR PICK-UP TRUCK OR OTHER VEHICLE

RELATED APPLICATION

This is a continuation-in-part application of my co-pending application Ser. No. 499,326, filed Aug. 21, 1974, and now abandoned.

BACKGROUND AND SUMMARY

The present invention relates to an adjustable end gate assembly for pick-up trucks, truck livestock racks, livestock trailers, or the like. Pick-up trucks for general farm use may be provided with rack sides and rack end gates made of wood, metal or other suitable material enclosing the truck box. A tailgate which swings downwardly may also be included.

Present commercially available pick-up trucks of the type with which the present invention is concerned normally have a single end gate, the width of which is less than the width of the storage portion of the truck. There are a number of different ways for mounting the end gate in these trucks so that they can be opened. For example, they can be completely removable, hinged at the side or raised from the top.

One purpose of the narrow width of the end gate opening is to reduce the openings between the sides of the truck and a livestock chute for loading livestock carried in the truck. Most of these trucks have a tailgate which lowers rearwardly about a horizontal axis. When the tailgate is lowered to the horizontal position and the end gate is opened, there exist side openings between the chute and the end of the truck because the tailgate prevents bringing the chute up flush with the opening Livestock may wander through these openings and perhaps be injured. It has, therefore, in the past been necessary to have a person stand on the tailgate to close off these side openings and to steer the livestock into the chute. In some cases the tailgate is removed from the truck or lowered completely so that the chute can be brought up flush with the rear of the truck. However, this requires accurate placement of the chute, and the ability to have the tailgate in the horizontal position adds to the overall utility of the truck.

According to the present invention, first and second end gates are pivotally mounted by hinges to the wooden rack sides of a pick-up truck. Thus, the complete back of the truck may be opened, if desired. Each of the hinges, in turn, is slidably mounted by means of a sleeve to a horizontally elongated guide bar or stringer so that the gates may be moved forwardly or rearwardly. Each of the gates is independently adjustable, and this adjustment together with the independent hinging action enables a person to adjust the end gate assembly to a livestock chute to facilitate the loading and unloading of livestock after the tailgate has been lowered.

The gates may be latched together at the center (i.e., closed) and when they are moved to the forward position, livestock may be located in front of the gates and feed or other items located in the rear of the truck box, separated by the end gates from the livestock. The hinges permit the weight of the end gates to be transferred directly to the floor of the box so that, in the closed position, the end gates brace the sides of the truck.

In addition, the gates may be latched closed and secured at the rear position of the truck, whereby the entire load space or box may be used to transport the livestock.

Further, the gates may be unlatched at the center, moved forward, and rotated outwardly, and secured to the rack sides in the open position.

The present invention thus provides a simple, yet rugged and economical construction which greatly facilitates independent adjustment of the end gates to connect to a livestock chute and to close off the side openings between the chute and rack sides of the truck. Because the gates are independently adjustable, it is not necessary that the livestock chute be centered on the truck in order to achieve a good fit between the end gates and the chute. That is to say, in all cases, the end gates may be used to close off the space between the truck sides and the side of the chute.

A number of sets of gates may be used on the same vehicle to provide adjustable dividers. For example, on a horse trailer, the gates may be used to partition the vehicle to form individual stalls.

Other features and advantages will be apparent to persons skilled in the art from the following detailed description of a preferred embodiment accompanied by the attached drawing wherein identical reference numerals will refer to like parts in the various views.

THE DRAWING

FIG. 1 is a rear perspective view of a pick-up truck including an end gate assembly constructed according to the present invention;

FIG. 2 is an upper perspective view of the sliding hinge assembly used to mount the end gates;

FIG. 3 is a top view of the sliding hinge assembly with the end gate latched open, broken away in the center to shorten the view and with the sides and end gate shown in cross section;

FIG. 4 is a partially broken-away top view similar to FIG. 3 but with the end gate in the rear position;

FIG. 5 is a broken-away close-up perspective view of the rear side latch, showing the end gate secured in an open position; and FIG. 6 is a broken-away close-up view, in perspective, showing the end gate in its rear position, but with the corner latch not fastened to it.

DETAILED DESCRIPTION

Referring first to FIG. 1, reference numeral 10 generally designates the box or bed of a conventional pickup truck having metal sides 11 and a tailgate 12 which is shown in its lowered or open position. The metal sides 11 are fitted with wooden sides 13 (metal or other suitable material may also be used) which are similar in construction and which support a central end gate assembly generally designated 14.

The end gate assembly 14 includes first and second end gates 15, 16 which may be latched together in the center by a pair of latches generally designated 18, at both an upper and a lower position, as shown.

In the illustration of FIG. 1, the end gates 15, 16, are secured together at the center, and they are moved to a forward position—that is, intermediate the forward and rear locations of the load area. This is sometimes referred to as the "fair" truck because it permits the loading of livestock in the forward portion of the box ahead of the end gate assembly 14, and the loading of feed or other goods in the space behind the end gate assembly but forward of the tailgate 12 when it is raised.

The end gate assembly of the present invention is movable between the position shown in FIG. 1 and the rear of the load area by means of sliding hinge assemblies generally designated by reference numeral 20. A sliding hinge assembly 20 is located at an upper and a lower position for each outboard side of the end gates 15, 16. Thus, there are a total of four such sliding hinge assemblies, but they are similar so that only one need be described further for a complete understanding of the invention.

Turning now to FIGS. 2 and 3, the sliding hinge assembly 20 is seen to include a guide rod or stringer 21 which extends in a horizontal direction and is secured at its forward end 22 to the wooden side 13 by conventional nut and bolt fasteners 24. The guide rod or stringer 21 is spaced inwardly from the wooden side 13 of the truck by means of a spacer 26 to which the stringer 21 is welded.

The rear end of the stringer 21 is welded to an end plate 27 which extends vertically and is secured to a corner post 28 of the truck by means of bolts 29.

Slidably received on the stringer 21 is a tubular member or sleeve 30 to which is welded a horizontal bar 31 which extends rearwardly thereof. The sliding hinge 20 is arranged so that there is some looseness between the sleeve 30 and its associated stringer. The purpose of this is to enable the weight of the gate to be carried by the floor of the truck box. In other words, the sleeve 30 is slightly oversize to permit the bar 31 to adjust or tilt rearwardly in cooperation with the lever action tilt of horizontal bar 31 until the end gate rests on the floor.

At the rear end of the bar 31 is welded an upright sleeve or socket 32. Rotatably received within the socket 32 is a vertical rod 33 which serves as a hinge pin for the gates 15 and 16. This pin is preferably removable so that the end gates can be completely removed. The top and bottom of the hinge pin 33 are connected to the rear surface of the gate 15 by means of end connectors, the one for the top being shown in dashed line in FIG. 2 and designated 35, and the end connector for the bottom being shown in FIG. 6 and designated 37. Each end connector includes a cap which is secured to the pin 33, and a flange 38 which is attached to the rear surface of the end gate 15 by bolts or similar means.

The illustration of FIG. 2 may best be thought of as an upper left sliding hinge assembly. When it is used as a lower hinge assembly, a piece of pipe or tubing 40 is welded to the sleeve 32, as seen in dashed line in FIG. 2 but solid in FIG. 6. A similar piece of tubing 41 is secured to the gate 15 adjacent the inner edge thereof but at the same height as the tube 40, see FIGS. 3, 4 and 5. A latch generally designated 45 is attached to the end post 28 for securing either the inboard end of the gate 15 by connecting to the tube 40 or the distal end of the gate 15 by securing to the tube 41 (see FIGS. 4 and 3 respectively for these positions).

The latch 45 includes a tubular socket 46 which may be attached to the end post 28 by a flange 47 and bolts, and a latch member 49 which includes a handle 50 and a downwardly depending hook member 51, which fits into either the tube 40 or the tube 41, as already discussed.

Latches may also be attached to the inner surfaces of the sides 13 to secure the end gates in the forward position, as seen in FIG. 1.

OPERATION

In the ordinary travel position, the end gates 15, 16 are moved to the forward position on the stringers. The gates are then opened, and the distal ends of the gates are latched to the rack sides, as shown in solid line in FIG. 3. This leads the back open to reduce wind resistance and save gas, while the end gates are conveniently stored against the rack sides.

For hauling, the end gates may be closed in the intermediate position shown in FIG. 1 if its is desired to separate the load. For example, livestock may be stored in the forward portion of the truck box and feed may be stored between the end gates and the tailgate. If more storage space is required for hauling, the end gates may be moved to the rear position shown in FIG. 4 and latched there by the latches 45. The distal or inner ends of the end gates may also be latched together in this position. Normally, in this position, the tailgate is raised to add still further support to the lower portion of the end gates.

If still more room is needed for hauling, the tailgate may be lowered, and the end gates may be swung rearwardly while in the rearmost position so that the end gates extend out over the tailgate 12. It will be observed that in this position the end gates are fully opened to provide an opening which is only slightly smaller than the spacing of the rack sides of the truck, and in such a position, livestock may be unloaded without the fear of crowding which may cause injury.

When it is desired to use a livestock loading chute, the tailgate 12 is, of course, lowered to the horizontal position as seen in FIG. 1; and the truck backed to the chute. The end gates 15, 16, may be open in the storage position shown in FIG. 3 while the truck is moved into position. Thereafter, the gates are unlatched at the rear (FIGS. 5 and 6) so that each gate may be moved along its supporting sliding hinge assemblies 20 upon stringer 21. The gates are rotated inwardly until the distal end of the gate aligns with and contacts the inboard end of the nearest side of the chute, thereby protecting the rear portion of the side 13 and closing off the opening between the chute and the rack side of the truck so that livestock cannot escape through that opening. The other gate may be similarly moved and rotated independently of the first gate so that each gate may be independently adjusted in position lengthwise of the truck box and rotated for proper alignment. Thus, the chute does not have to be critically located either in a fore-or-aft direction or in a centered position. In any position of the chute, the gates 15, 16 may be readily and easily adjusted to facilitate closing of the gates onto the mouth of the load chute while completely closing off the side openings; and when thus adjusted, the gates form a V-shape for funneling the livestock from the truck box to the chute without crowding or injury to the livestock.

Whenever the gates are moved (for opening, closing or positioning lengthwise of the truck box), they are lifted slightly so that they do not drag on the floor and moved to desired position by sliding along the stringer. When in position, however, they are lowered, so that their weight does rest on the floor. This raising and lowering is made possible by the "play" allowed by the hinge (oversizing the sleeve 30), as mentioned above, and the rearwardly extending bar (FIGS. 2, 3).

After the last animal is loaded, to close the truck and secure the load, the gates are pulled toward the rear of the stringers and rotated inwardly to the position of FIG. 4. When the inboard ends of the gates are aligned, they are latched together by the latches 18, and the proximal ends of the gates are latched in the rear position by the latches 45. The tailgate is then lifted and closed.

When it is desired to use the truck in the "fair" position, the gates are double latched at the center as at 18 in FIG. 1, and moved to the forward position on the sliding hinges. It will be observed that in this position, the end gates rest on the floor of the truck box (FIG. 1). When they are latched together by the two center latches shown at 18, they become a rigid reinforcement or brace to strengthen the rack sides. This is important because, unlike other end gates for pick-up trucks, the present invention extends the gates from side to side and without any further bracing of the wooden rack sides of the truck box.

When the gates located in the dotted position of FIG. 3, as already mentioned, the forward portion of the truck box may be used for livestock, and the rear portion of the box behind the end gates may be used for feed, etc.

For unloading livestock when a chute is not employed, the tailgate is lowered and the latches 45 are unlatched, as are the center latches 18. The end gates are then swung fully opened in the rear position. This fully opened position is advantageous because it eliminates the narrow end gate opening where two animals may crowd and be injured. Further, larger objects may be loaded and unloaded through the larger end opening.

The end gates may be secured in the open position by moving the gates to the forward position as shown in FIG. 3. The gates are then swung outwardly as seen in FIG. 3 so that the end latch 45 may be secured to the center pipe section 41. In this position, the gates are prevented from swinging inwardly or from moving longitudinally of the guide bars 21, and they also rest on the floor of the truck box. It will thus be observed that the rack sides of the truck do not carry the weight of the gates, which is advantageous.

In summary, the hinges have three separate functions: (1) they permit a continuous and independent adjustment of the position of the end gate lengthwise of the truck box; (2) they permit the end gate to rotate about a vertical axis for opening and closing; and (3) they permit the end-gate hinge to adjust upon a horizontal axis so that the weight of the gate is supported by the floor of the truck box, not the hinge, and the gate can then act to brace the vehicle sides.

Having thus described in detail a preferred embodiment of my invention, persons skilled in the art will be able to modify certain of the structure which has been illustrated and to substitute equivalent elements for those disclosed while continuing to practice the principle of the invention, and it is, therefore, intended that all such modifications and substitutions be covered as they are embraced within the spirit and scope of the appended claims.

I claim:

1. In combination with a vehicle such as a pick-up truck or the like having a load box and a floor and upright sides partially defining said load box, an improved adjustable end-gate assembly comprising:

first and second gates, each approximately one-half the vehicle opening width, a pair of sliding hinge assemblies mounting each of said end gates to a respective side of said vehicle, each hinge assembly including a horizontally elongated stringer secured at forward and rear positions to an associated side of said vehicle, a sleeve slidably mounted on said stringer for movement between a forward position intermediate the ends of a side of said vehicle and a rear position adjacent the end of said vehicle, and hinge means carried by said sleeve for mounting an associated gate for pivotal motion about a vertical axis, each pair of said hinge assemblies permitting their associated gate to lower and rest on the floor of said truck box, whereby a livestock chute may be placed against the rear of said vehicle and said gates may be independently positioned along their associated stringers and rotated to contact an adjacent side of said chute to close off the side openings between said chute and said vehicle sides, said gates resting on the floor of said box in all adjusted positions.

2. The apparatus of claim 1 further comprising latch means for latching the distal ends of said gates together, whereby said gates can be closed either in a forward position on said stringer to separate the load area of said vehicle into two areas, or in a rear position on said stringer to fully enclose the load box of said vehicle, said gates bracing said side walls when closed and latched together.

3. The apparatus of claim 1 further comprising latch means associated with each of said gates for securing the outboard end of an associated gate in its rear position, whereby when thus secured, said gate cannot move forwardly.

4. The apparatus of claim 3 wherein said stringers extend approximately the length of an associated gate; and further comprising socket means at the distal end of the outer surface of each end gate and adapted to be secured by said latch means, whereby the proximal end of each of said gates may be independently moved to a forward position on said stringers and latched in an opened position.

5. The apparatus of claim 1 wherein said stringers extend approximately the length of an associated gate.

6. The apparatus of claim 1 wherein each of said sliding hinge assemblies further includes a sleeve, a rearwardly extending bar secured to an associated sleeve, a vertical socket mounted at the distal end of said bar and receiving a hinge pin for securing the hinge assembly and upright sleeve or socket and flange to each associated gate.

* * * * *